Sept. 4, 1923.
H. A. DENMIRE
COLLAPSIBLE TIRE CORE
Filed Feb. 3, 1921
1,467,142
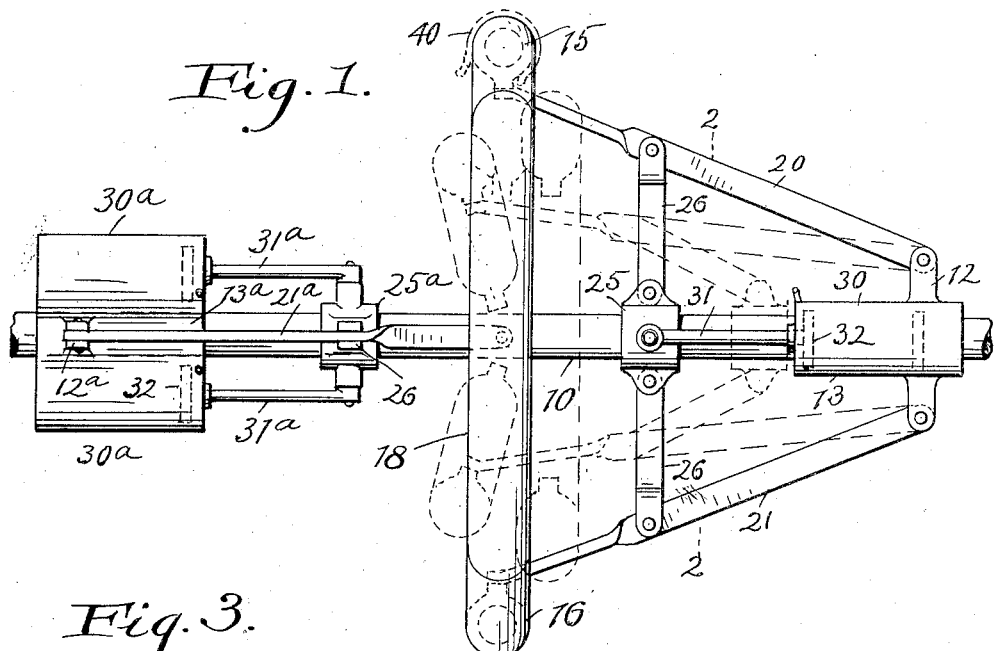
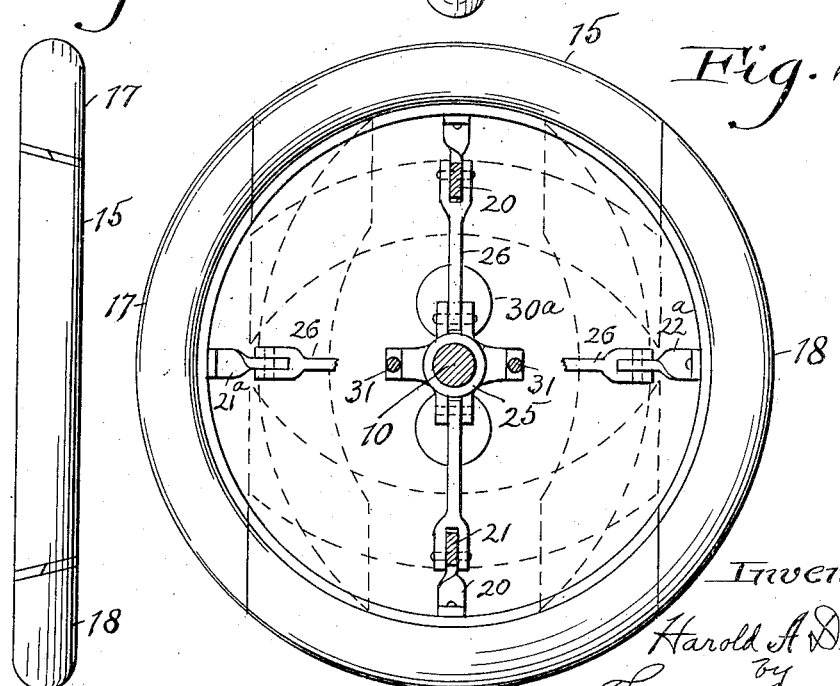
Inventor
Harold A. Denmire
by
Thurston Kwis & Hudson
attys.

Patented Sept. 4, 1923.

1,467,142

UNITED STATES PATENT OFFICE.

HAROLD A. DENMIRE, OF AKRON, OHIO, ASSIGNOR OF ONE-HALF TO THE GENERAL TIRE AND RUBBER COMPANY, OF AKRON, OHIO, A CORPORATION OF OHIO.

COLLAPSIBLE TIRE CORE.

Application filed February 3, 1921. Serial No. 442,153.

*To all whom it may concern:*

Be it known that I, HAROLD A. DENMIRE, a citizen of the United States, residing at Akron, in the county of Summit and State of Ohio, have invented a certain new and useful Improvement in Collapsible Tire Cores, of which the following is a full, clear, and exact description.

This invention relates to the kind of collapsible tire cores which, without being demounted from the tire stand on which a core must be rotatably supported in order that a tire casing may be made thereon, may be collapsed sufficiently to enable the removal of a finished tire casing therefrom, and expanded for use in building another tire casing thereon.

The invention consists in the construction and combination of parts shown in the drawing and hereinafter described and pointed out definitely in the appended claims.

In the drawing, Fig. 1 is a side elevation of a collapsible core mechanism which embodies this invention; Fig. 2 is a sectional view thereof in the plane of line 2—2 on Fig. 1, and Fig. 3 is a plan view of an expanded core per se disassociated from the mechanism by which the core sections are supported and moved.

Referring to the parts by reference characters, 10 represents a shaft which is to be rotatably supported on a suitable tire stand which may be like those which are in common use for this purpose.

The core is made up of a plurality of pairs of arc-shaped sections, two of such pairs being shown and preferred. One pair comprises the core sections 15 and 16 which lie on opposite sides of the shaft.

The other pair comprises the arc-shaped sections 17 and 18 which are disposed on opposite sides of the shaft but in position such that they may be circumferentially aligned with and between the sections 15 and 16 to form a complete annulus, which will of course have the cross sectional configuration required for a tire core.

The meeting ends of these core sections must be so shaped that when the sections are circumferentially aligned a complete annulus will be formed; and these ends must be so formed as to permit the core sections 15 and 16 to be moved inward from between the expanded sections 17 and 18 and again outward into position between said sections when expanded. To effect this result, the abutting ends of the section are slightly inclined with respect to a diametrical plane extending through the middle of the core sections 15 and 16 as shown in Fig. 3.

The two core sections 15, 16, are respectively fixed to the outer ends of two levers 20, 21, at points midway between the ends of said core sections. These two levers occupy diametrically opposite positions and are pivoted to ears 12 which are carried by a collar 13 that embraces and is fixed to shaft 10.

A sliding sleeve 25 is mounted on shaft 10, and this sleeve is connected by two links 26 with the two levers 20, 21, respectively. By moving the sliding sleeve 25 along shaft 10 toward collar 13 the levers 20, 21, will be swung inward about the pivots which connect them with collar 13, thereby carrying the core sections 15, 16, to which the levers are attached, toward the axis of the shaft and out of contact with the end of the core sections 17, 18.

In order to so move the sliding sleeve 25 two fluid pressure cylinders 30 are fixed to collar 13. The piston rods 31 are fixed to the pistons 32 in said cylinders and project from the ends of the cylinders and are fixed to the sliding sleeve 25. By admitting pressure fluid into the cylinders first at one end and then at the other, the sleeve 25 may be moved back and forth on shaft 10, with the results as stated.

The other core sections 17, 18, are associated with similar supporting and actuating mechanism, but it is located on opposite sides of the expanded core to the mechanism before specifically referred to for supporting and moving the core sections 15, 16. The mechanism for moving the core sections 17, 18, includes a collar 13ª fixed to the shaft and carrying two cylinders 30ª; two levers 21ª, 22ª which are pivoted to the sleeve 13ª and are respectively secured to the two core sections 17, 18, midway between the ends thereof; a sliding sleeve 25ª which is mounted on the shaft and is connected by links 26 with the two levers 21ª, 22ª, respectively; pistons 31ª in the cylinders, and piston rods which project from the ends of the cylinders and are secured to the sliding sleeve.

When all of the core sections are in the expanded position a tire casing 40 may be built upon the resulting annular core in the usual manner. When the tire casing is completed it is desirable and probably necessary to first loosen the inner part of the tire casing from the core and to swing it outward, as shown in Fig. 1. Then sliding sleeve 25 must be caused to move along shaft 10 toward the associated collar 13, with the result that the two core sections 15, 16, will be drawn out of the tire casing and toward shaft 10 moving in arcs of which the centers are pivots of the levers 20, 21, on collar 13.

When these core sections have been moved as stated the sleeve 25ᵃ will then be caused to move toward the associated fixed sleeve 30ᵃ whereby through the described mechanism the core sections 17, 18, will be swung out of the tire casing and toward the axis of the shaft, moving in arcs whose centers are the pivots connecting levers 20ᵃ, 21ᵃ with the sleeve 30ᵃ.

The finished tire casing may now be removed from the apparatus; and the core sections expanded by the reverse movement of the parts, it being of course understood that the core sections 17, 18, must first be moved to their expanded positions; and that thereafter the core sections 15, 16, will be moved to their expanded positions and between the ends of the core sections 17, 18.

Having described my invention, I claim:—

1. A collapsible tire core comprising two pairs of circumferentially alinged arc-shaped sections, combined with means whereby a pair of said sections may be simultaneously moved toward the axis of the core and out of alignment with the other pair and to one side of the plane in which the expanded core is located, and other means for simultaneously moving the other pair of core sections toward the axis of the shaft and to the opposite side of the plane in which the expanded core is located.

2. A collapsible tire core made up of two pairs of movable arc-shaped sections which in their expanded positions will be circumferentially alinged and form an annular core; the sections of each pair being located in diametrically opposite positions but between the ends of the sections of the other pair, means by which to move and hold said sections in the expanded and circumferentially aligned positions and to move them away from their position through paths which carry the sections of one pair toward the axis of the shaft and to one side of the plane in which the expanded core is located and which carry the sections of the other pair toward the axis of the shaft but toward the opposite side of the plane in which the expanded core is located.

3. In a collapsible tire core, the combination of a shaft, two pairs of arc-shaped core sections adapted to be circumferentially alinged to form an annular core, a collar fixed to said shaft, two levers which are pivoted to said collar and are connected to the two sections of a pair of sections, and means to swing said levers toward and away from the shaft about the pivots which connect them with said collar.

4. In a collapsible tire core, the combination of a shaft, two pairs of arc-shaped core sections adapted to be circumferentially alinged to form an annular core which is coaxial with the shaft, two collars fixed to the shaft on opposite sides of the expanded core, a pair of levers which are pivoted to one collar and are respectively connected with the core sections of one pair, another pair of levers pivoted to the other section and respectively connected with the core sections of the other pair, and means for swinging the levers of one pair toward and away from the shaft, and other means for swinging the other pair of levers toward and away from the shaft.

5. In a collapsible tire core, the combination of a shaft, two pairs of arc-shaped core sections adapted to be circumferentially alinged to form an annular core, coaxial with the shaft, a collar fixed to said shaft, two levers which are pivoted to said collar and are connected respectively with the two sections of a pair of sections, pressure fluid cylinders, and mechanism operated thereby for swinging said pair of levers.

6. In a collapsible tire core, the combination of a shaft, two pairs of arc-shaped core sections adapted to be circumferentially alinged to form an annular core which is coaxial with the shaft, a collar fixed to said shaft, two levers which are pivoted to said collar and are connected respectively with the two sections of a pair of sections, a sliding sleeve on the shaft, and links connecting the sliding sleeve with the two levers respectively.

7. In a collapsible tire core, the combination of a shaft, two pairs of arc-shaped core sections adapted to be circumferentially aligned to form an annular core which is coaxial with the shaft, a collar fixed to said shaft, two levers which are pivoted to said collar and are connected respectively with the two sections of a pair of sections, a sliding sleeve on the shaft, and links connecting the sliding sleeve with the two levers respectively, pressure fluid cylinders secured to the fixed sleeve, and means operated thereby for moving the sliding sleeve along said shaft.

In testimony whereof, I hereunto affix my signature.

HAROLD A. DENMIRE.